United States Patent [19]

Koltse

[11] 4,329,235
[45] May 11, 1982

[54] APPARATUS AND METHOD FOR DISPENSING PURIFYING MEDIA MIXTURE

[76] Inventor: John G. Koltse, 2939 N. Oakley Ave., Chicago, Ill. 60618

[21] Appl. No.: 117,465

[22] Filed: Feb. 1, 1980

Related U.S. Application Data

[63] Continuation-in-part of Ser. No. 915,815, Jun. 15, 1978, abandoned, which is a continuation-in-part of Ser. No. 785,832, Apr. 8, 1977, Pat. No. 4,133,757.

[51] Int. Cl.³ .............................................. B01D 37/02
[52] U.S. Cl. ................................... 210/777; 210/143; 210/193
[58] Field of Search ............... 210/193, 770, 387, 421, 210/769, 777, 778, 143

[56] References Cited

U.S. PATENT DOCUMENTS

| | | | |
|---|---|---|---|
| 2,367,851 | 1/1945 | Eaton | 210/193 X |
| 2,679,936 | 6/1954 | Bench | 210/193 X |
| 3,064,816 | 11/1962 | Gaiswold | 210/193 X |
| 3,403,784 | 10/1968 | Blumberg | 210/770 |
| 3,549,523 | 12/1970 | Giland | 210/193 X |
| 3,693,797 | 9/1972 | Topol | 210/193 X |

*Primary Examiner*—John Adee
*Attorney, Agent, or Firm*—Alter and Weiss

[57] ABSTRACT

Apparatus and method for injecting media purifying mixtures into process equipment in precise, discrete, volumetric quantities. Purifying mixtures may be added at selectively determinable time intervals, or responsive to an operating characteristic of the system. The total amount of purifying material may be accurately controlled by varying the number of fixed volumetric units injected, or by varying the concentration of the purifying material in the mixture. The apparatus includes provision to assist injection of said units into said process equipment, while providing apparatus and methods to prevent the supply lines from clogging.

20 Claims, 3 Drawing Figures

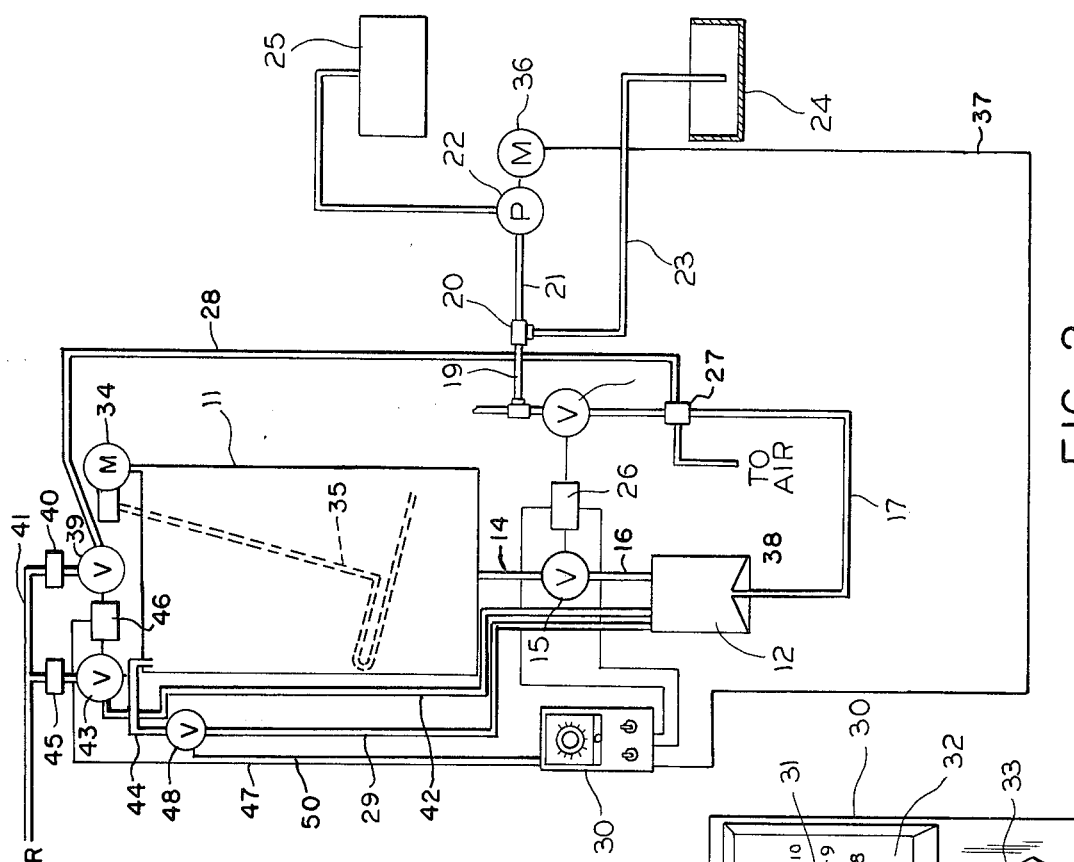
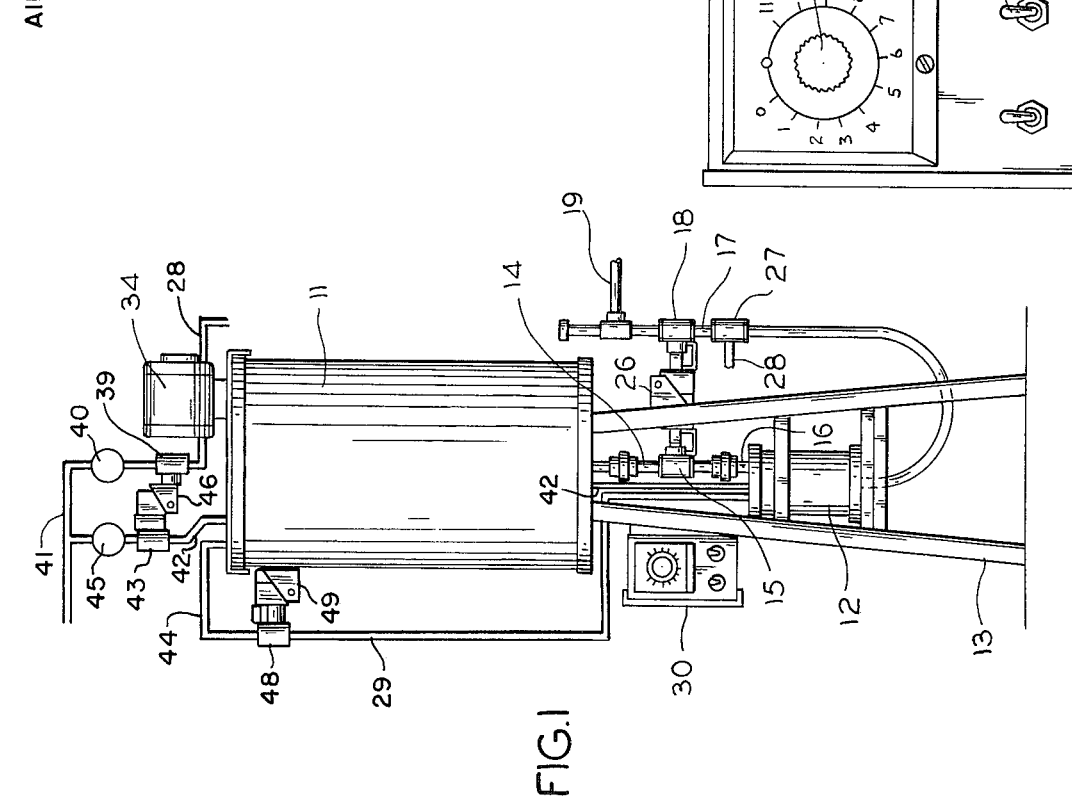

APPARATUS AND METHOD FOR DISPENSING PURIFYING MEDIA MIXTURE

This is a continuation-in-part of my application Ser. No. 915,815, filed on June 15, 1978, since abandoned, which is a continuation-in-part of my application Ser. No. 785,832, filed on Apr. 8, 1977, which issued as U.S. Pat. No. 4,133,757, on Jan. 9, 1979.

This invention relates generally to continuous filtering systems and more particularly to methods and apparatus for adding additional filtering material without interrupting the filtration process.

Continuous filtering of solutions used during electrochemical processing converts an essentially batch process into a continuous process by eliminating the need to suspend operations while the process liquid is either filtered and returned to the reaction vessel, or pumped into a large holding tank to be mixed with a purifying slurry. Continuous filtration also assures a more constant and controllable concentration of contaminants in the process liquid, rather than allowing the process liquid to become progressively more contaminated until it can no longer be used without filtration.

Automatic filtration apparatus, such as that described in U.S. Pat. Nos. 3,403,784 and 4,133,757, allows continuous filtration of a process liquid. Filter media, furnished in roll form, is extended across a perforated platen positioned within a filter chamber, through which the liquid to be filtered is pumped. As the filter media becomes clogged with contaminants, the flow of process liquid may be temporarily interrupted to allow a fresh segment of filter media to be advanced into filtering position on the platen in the chamber.

While this has provided adequate results for those liquids requiring only mechanical filtration, it has been less successful where a second filtering material is needed to effect adequate clarification of the filtrate and to effect chemical as well as mechanical filtration. One such additional filtering element is finely divided carbon. Use of carbon with automatic filtering equipment has, however, presented significant problems.

Carbon is insoluble and must often be maintained in as finely powdered a texture as possible to present a maximum surface area available for filtration. The combination of these two factors presents significant material handling difficulties. To maximize filtration, the selected filter media must be furnished with an adequate amount of carbon; to maximize the efficiency of the automatic filter system, carbon must be furnished on an automatic basis compatible with the operation of the filter mechanism.

Several approaches have been taken to solve this carbon handling and supply difficulty. In one, the filter media is impregnated with carbon and carbon is thus present when the media is indexed into position to begin filtration. Preparation of such impregnated filter media is, however, expensive, and to date has produced unsatisfactory results in terms of even distribution of the carbon in the filter media and contact time with the process liquid. Because various filtering operations may call for different carbon requirements, a user may have to stock filter media of several different carbon concentrations resulting in expensive inventory requirements, and substantial down time when rolls of filter media must be changed.

Another approach has been to include a slurry tank in the filtration process, within which a suspension of carbon particles in liquid is maintained. As the unfiltered solution is pumped into the filter, liquid from the slurry tank is mixed with it. The mixture of unfiltered solution and slurry then reaches the filter media, at which point the carbon, together with the impurities in the unfiltered solution, is trapped on the filter media. This approach necessarily requires maintaining an adequate supply of slurry composition, and an adequate liquid level in the slurry tank, and again detracts from the efficiency afforded by the automatic filtration mechanism. Additional piping, pumps, and controls are also required.

Another, more successful approach is taught and described in my earlier issued U.S. Pat. No. 4,133,757. Carbon is dispensed from a supply hopper via a vibratory chute delivery system to the filter media as the filter media is being advanced into filtering position.

The amount of carbon delivered to the filter media may be roughly controlled by varying the vibration rate of the vibratory delivery mechanism. This system, however, also has several inherent difficulties. During carbon dispensing operation, dust is raised as the finely divided carbon is shaken onto the filter media. While this may not be a significant problem where a single filtration mechanism is used in a large, well-ventilated area, it may become significant when a number of filters are in concurrent use.

Another inherent difficulty with not only this system but others previously described is that the automatic filtration mechanism must be substantially and expensively altered to enable additional delivery systems to be used, and a separate system is required for each automatic filter in operation.

Another commonly encountered problem in transferring carbon in the form of a suspension is the tendency of the carbon to clog the conduits through which the suspension is drawn. This makes it necessary to use suspension with lower concentrations of carbon involving the transfer of larger volumes of suspension to achieve delivery of a desired weight of carbon.

It is to be understood that the problems discussed hereinabove with respect to carbon are, to some degree, encountered with other additional filter materials as well. Solutation of these problems is important to assure good filter operation.

Accordingly, the present invention has the following objects:

To provide systems for adding filter material to an automatic, continuously filtering apparatus;

To provide such systems in forms adaptable to the use of finely divided carbon particles as an additional filter material;

To provide such systems in forms adaptable to the use of pre-coat type filter materials;

To provide such systems with automatic filter material handling features;

To provide such systems allowing precise metering of the amount of additional filter material added to the system;

To provide such systems in forms utilizable with roll-type filter media;

To provide such systems in forms whereby a single system may service more than one automatic filtration apparatus;

To provide such systems in forms minimizing the clogging effect of additional filter material on delivery conduits;

To provide such systems in forms wherein delivery of additional filter material is boosted or otherwise assisted;

To provide such systems in forms providing simple and convenient connection with automatic filtration apparatus; and To provide such systems in forms simple to manufacture and maintain, and economical to use.

These and further objects will become more apparent upon a consideration of the accompanying drawings, in which:

FIG. 1 is a perspective view of a preferred embodiment of the delivery system herein;

FIG. 2 is a schematic block diagram illustrating the operating features of the system shown in FIG. 1; and FIG. 3 is a detail of the cycle control shown in FIG. 1.

Consistent with the foregoing objects, apparatus 10 is provided having a supply tank 11 within which filter material is maintained in a liquid mixture of known concentration. A canister 12, of known volume, may be filled through tank valve 15 from supply tank 11, and may be selectively drained through supply line 17 and supply valve 18 to filter chamber 25. Canister 12 is maintained in a filled attitude when supply valve 18 is closed and tank valve 15 is opened to enable liquid to drain into canister 12. Cycle control 30 enables said apparatus to be cycled through a desired number of fillings and drainings of canister 12 to enable delivery of a desired quantity of filter material to filter chamber 25. Canister 12 is vented by vent line 29 while it is being filled. Prior to draining of canister 12, compressed air is injected via valve 39 and line 28 to the bottom of canister 12 in order to resuspend any filter material which has settled between cycles. When canister 12 is embodied, valve 48 closes off vent line 29 and valve 43 opens purge line 42 which enters canister 12 at the top to aid in forcing the additional filter material from canister 12 and to blow out any filter material residue in line segments 17, 19, and 21. Said draining and filling cycles may be performed at regular selected time intervals, or responsive to an operating characteristic of the process to which material is being supplied.

Referring now to FIG. 1, the number 10 indicates generally a filter material delivery system, having a supply tank 11 and a canister 12. As shown in FIG. 1, delivery system 10 has a metal frame support stand 13 to which the various components of delivery system 10 may be conveniently secured in spaced functional relationship.

Supply tank 11 communicates with canister 12 via tank outlet 14, tank valve 15, and canister inlet 16. In the embodiment herein shown, canister 12 is formed as a cylinder fashioned from clear plastic sealed off liquid-tightly at its top and bottom with end plates of similar plastic. As will be more fully described hereinbelow, canister 12 may be drained through filter supply line 17, and through supply valve 18.

As shown schematically in FIG. 2, pump supply line 19 extends past supply valve 18 to pump tee connection 20. Supply line segment 21 continues from tee 20 to filter circulating pump 22, while branch line 23 extends from pump tee 20 to drip pan 24. In the embodiment herein contemplated, pump 22 is a component of an automatic filtration apparatus of the type having a circulating pump which moves the process liquid to a filter chamber, with the chamber herein schematically depicted at 25 of FIG. 2. After filtration, the process liquid is returned to the process vessels, via piping and tubing not herein specifically shown.

Customarily, in such filter apparatus, drip pan 24 may be positioned beneath the apparatus to catch any drips or leaks of process liquid, and branch line 23 extends into drip pan 24 to enable such drips to be drawn into pump 22 and thus recirculated. Use of pump tee 20 enables pump supply line 19 to be connected to pump 22 at the site usually occupied by line 23, and further enables additional filter material drawn through line 17 and line 19 to enter the filtration process, in a manner to be more fully set forth hereinbelow. Thus, apparatus 10 may be connected to an automatic filter with a minimum of piping, and without requiring extensive modification of the filter.

In a present preferred embodiment, the opening and closing of tank valve 15 and supply valve 18 is controlled by valve solenoid assembly 26. In the arrangement herein illustrated, solenoid assembly 26 acts to simultaneously open supply valve 18 and close tank valve 15, and to close supply valve 18 and open tank valve 15. Activation of solenoid assembly 26 may occur at preset timed intervals, or may occur responsive to a selected operating characteristic of the automatic filtering apparatus, as discussed in greater detail hereinbelow. In this manner, filling and metering activities may be carried out with a minimum of hardware required, and without extensive modification to the automatic filtration apparatus.

As seen in FIG. 1, a preferred embodiment of the present invention includes an air tee 27 positioned on supply line 17 upstream of supply valve 18 and downstream of canister 12. Air line 28 enables compressed air to be blown through air tee 27 and supply line 17 for selected segments of the delivery cycle, as will be more fully explained hereinbelow.

Vent line 29 is provided to extend from canister 12 to facilitate the filling of canister 12. As presently contemplated, vent line 29 extends upward to a point above any expected level of liquid in supply tank 11, and empties into tank 11 via vent segment 44 thereby obviating the problem of spills or overflows. Vent line 24 may be selectively closed off by vent valve 48.

Cycle control 30, best illustrated in FIG. 3, is preferably used to control the number of filling and emptying cycles through which apparatus 10 may be put. Control knob 31 may be set to any number of cycles as shown on face plate 32. In this example, anywhere from 0 to 11 cycles may be selected. A separate control, such as switch 33 may be provided to enable an operator to cause system 10 to cycle in a manual mode whenever desired.

Supply tank 11 has agitator motor 34 and agitator 35 mounted thereon in order to maintain the selected additional filter material in suspension within supply tank 11, providing a more uniform concentration of additional filter material throughout supply tank 11. In a preferred embodiment, impeller 35 is vertically orientated and is rotatably supported by a bearing at the bottom of tank 11, and has at least two sets of axial flow impellers mounted therealong, although such an impellers are not herein specifically illustrated. A one-half horsepower motor has enabled mixer 34 to handle solutions as heavy as 15 pounds of solids in 30 gallons of water.

Compressed air entering tee 27 is directed along line 17 to the bottom of canister 12 for the purpose of agitating the liquid in canister 12 in order to insure that the additional filter material remains in suspension. To aid in this agitation, canister 12 may be formed with a domed bottom as schematically illustrated at 38 of FIG. 2. The agitation carried out in canister 12 will also involve compressed air being directed upward through valve 15, which, it is contemplated, will aid in preventing the clogging of valve 15 and line segments 14 and 16.

To control the flow of air entering tee 27, agitation air valve 39 is provided, together with pressure regulator 40 which communicates with supply air conduit 41.

To aid in emptying canister 12, and in keeping line segments 17, 19, and 21, and tee 27 and valve 18 clear of suspended additional filter material, purge line 42 is provided extending upward from the top of canister 12, roughly parallel to vent line 29.

It is presently contemplated that vent line 29 should be closed off when purge line 42 is in use, and vice versa. To effect such control, vent valve 48 is provided which, in a first operating position, completes a path through vent line 29, valve 48, and vent segment 44 to vent canister 12. In a second operating position, vent valve 48 closes off vent line 29. Valve 48 is controlled by vent actuation solenoid 49, connected to control 30 via electrical line 50.

To insure proper sequential operation of valves 39 and 43, valve actuator 46 is provided which accommodates both valves simultaneously, much as actuator 26, previously described. Circuitry is provided, such as illustrated schematically at 47, to control actuator 46 via cycle control 30.

Operation of delivery system 10 may be described in the following preferred embodiments. Liquid is added to supply tank 11; most commonly, the liquid selected will be water. A selected additional filter material is then added to tank 11, and agitator motor 34 and agitator 35 are activated to thoroughly mix the additional filter material with the liquid placed in supply tank 11, producing a suspension or solution with a known and substantially uniform concentration.

The selected concentration of filter material within supply tank 11 may be provided by calculating the amount of additional filter material required to achieve such a concentration when added to the amount of liquid present in supply tank 11.

Once the desired mixture of additional filter material is maintained within supply tank 11, the next procedure is to determine when the additional filter material should be added to the automatic filtration device, and in what amounts. Commonly, additional filter material may be added at preselected time intervals. In such cases, cycle control 30 may be set to deliver filter material to circulating pump 22, and thereby to the filtration apparatus, at a given selected interval of time.

Supplying additional filter material at regular rimed intervals may, however, be inappropriate for certain specific processes or applications. As an example, addition of filter material at regularly timed intervals may be unrelated to the amount of material actually required by the filtration process. Additionally, it has been found that, in plating solutions in particular, where a solution has sat dormant through the night, and is then activated for use in the morning, more sediment and sludge is collected within the automatic filtration apparatus during the first few hours of use than are collected over comparable time periods during the remainder of use than are collected over comparable time periods during the remainder of the working day.

One solution to this problem is to add additional filter material to the filtration apparatus each time a fresh segment of filter media has been advanced into filtering position. Customarily, new filter media may be moved into filtering position when, for example, the build up of contaminants on the old segment of filter mdia causes a pressure drop across the filtration chamber of a certain, preselected, value. A faster buildup of contaminants on the filter media, will, of course, result in such a pressure drop over a shorter period of time than during a slower buildup.

Methods and apparatus for activating delivery system 10, either at preset time intervals, or responsive to an operating condition of the automatic filtration apparatus such as the advance of fresh filter media are well known, and need not be specifically detailed here. The preferred embodiment herein discussed includes an electrical connection delivery system 10, whereby interruption of power to pump 22 may be detected.

During the holding cycle of apparatus 10, the following conditions exist. Solenoid control 26 maintains supply valve 18 in a closed attitude and tank valve 15 in an open attitude. Canister 12 is thereby filled with liquid from supply tank 11 via upper outlet 14 and lower inlet 16. Vent valve 48 is set to open vent line 29, while agitation valve 39 is in a closed attitude, blocking the flow of compressed air to tee 27.

In a preferred embodiment wherein activation of delivery system 10 is conditioned upon advance of fresh filter media into filtering position within filter chamber 25, the following sequence occurs. Immediately prior to the advance of a fresh segment of filter media, pump motor 36 of circulating pump 22 is stopped, responsive to the control system of the particular automatic filtration apparatus. While said pump is shut down, the old segment of filter media is advanced for filter chamber 25, and a fresh segment of filter media is positioned therewithin. After positioning is complete, power is restored to pump motor 36, thus activating circulating pump 22.

Thereafter, via said electrical connection between the control system of the automatic filtration apparatus and solenoid control 26, agitation valve 39 opens to admit compressed air regulated by pressure regulator 40 to a selected pressure to travel via line 28 and tee 27 into the bottom of canister 12 to agitate the liquid in canister 12 in order to assure that the additional filter material remains in suspension and that line segment 17 remains free of sediment.

During the injection of agitating air via agitation valve 39, the level of liquid in canister 12 changes as liquid is forced upward through line segment 16 and along vent line 29. After agitation has continued for a selected amount of time, agitation valve 39 is then closed. It has been found that agitation for 15 seconds at a pressure of between 10 to 20 psi has been effective. The ramped shape illustrated at 38 of the canister bottom may be selectively incorporated to aid in the agitation of the liquid therein.

When agitation valve 39 closes, liquid is allowed to drain into canister 12 to refill canister 12 via fill valve 15, thus making a discrete unit of mixture available to the filtration process. During such filling, vent line 29 remains open to facilitate the displacement of air from canister 12.

After canister 12 has refilled, fill valve 15 is closed, empty valve 18 is opened, vent valve 48 is closed and purge valve 43 is opened whereby compressed air regulated by pressure regulator 45 is admitted through line 42 to the top of canister 12 to aid in forcing the liquid from canister 12 and to clear canister 12 and line segments 17, 19 and 21 from sediment. The contents of canister 12 reach pump 22 and are thereby pumped to filter chamber 25 where the additional filter material maintained within canister 12 is deposited upon the filter media, thereby becoming a part of the filtration process.

After canister 12 has emptied, and responsive to cycle control 30, purge valve 43 is closed, solenoid 26 is again activated to close supply valve 18 and open tank valve 15. Vent valve 48 is opened, and filter mixture drains from supply tank 11 to refill canister 12, to thereby hold said liquid until the next cycle is called for.

As discussed above, cycle control 30 may be set to deliver as many cycles as is required to bring a specified amount of additional filter material to filter chamber 25. As an example, let us assume that the additional filter material is suspended within supply tank 11 to a concentration of 1 pound per gallon, and that the volume of canister 12 is selected to be one quart. Thus, when canister 12 is filled, four ounces of carbon will be present therein.

If it is calculated that each advance of filter media requires deposit thereon of one pound of carbon to carry out effective filtration operations, cycle control 30 may be set to deliver 4 cycles each time filter media is advanced within filter chamber 25. Thus, after fresh filter media has been positioned within filter chamber 25, agitation valve 39 is opened for several second to "mix" the contents of canister 12, and is thereafter closed. Solenoid 26 is then activated to open supply valve 18 and close tank valve 15, and vent valve 48 closes, and purge valve 43 operates to feed compressed air to the top of canister 12 to drain the contents of canister 12 through circulating pump 22 into filter chamber 25.

Responsive to cycle control 30, said cycling operation may be automatically repeated 3 additional times until a total of 16 ounces of carbon has been delivered to filter chamber 25. Such cycling is particularly feasible because circulating pump 22 continues to operate except when additional filter media is being advanced to filter chamber 25. Thus, pump 22 will draw filter material liquid from canister 12 is refilled and supply valve 18 is opened to complete a direct path from canister 12 to circulating pump 22.

It can thus be seen that delivery of additional filter material to filter chamber 25 may be closely controlled by varying the concentration of said material within supply tank 11 and by selecting the number of cycles necessary to deliver a fixed weight of additional filter material from supply tank 11 via canister 12.

In this manner, the problems incurred with dry delivery of additional filter material, together with the disadvantages of dust and variation in the quantities delivered to filter chamber 25 are obviated.

By providing for intermittent operation of purge valve 43 and agitation valve 39, use of compressed air is minimized, and economical operation is made possible. Use of compressed air to purge operating lines also minimizes downtime resulting from clogging caused by insoluble filter aids. Mixer 34 may also be controlled to run intermittently, thus minimizing use of electricity, and making the entire system energy efficient.

It may also readily be seen that it is possible to service more than a single automatic filtration unit from a single delivery system 10 by providing a series of cycle controls 30 and a multiple series of solenoid control units 26. Said additional solenoid controls may be situated downstream of supply valve 18, to direct liquid drained from canister 12 to a particular, selected, automatic filtration apparatus. Such multiple cycle controls 30 may, of course, be wired in such a manner as to limit delivery of the contents of canister 12 to a single filtration apparatus should one or more of such filtration apparatus call for additional material at the same time. As the pumping and filtering operations are carried out continuously, it is contemplated that such a control system would either complete delivery of filter material to the first filter apparatus calling for same, and thereafter deliver the additional filter material to any other apparatus as is necessary, or would supply the units alternatively as required.

If desired, multiple systems 10 may be provided to deliver one or more different additional filter materials to the same filtration as required during the filtration process, thus affording a high degree of flexibility to automatic filtration operations. Presently contemplated embodiments of system include a supply tank 11 with a 15 gallon capacity, and a canister of one quart capacity, or a supply tank of 35 gallons capacity and a canister with a one-half gallon capacity. However, it should be understood that any vessel within which a supply of liquid may be maintained will be sufficient for purposes of operation of system 10.

An additional advantage to the particular embodiments herein described is that delivery system 10 may be connected to an automatic filtration apparatus of the type herein contemplated via several relatively simple links, not requiring its extensive rewiring or replumbing of the filter apparatus. As an example, a preferred embodiment requires the placement of tee 20 at pump 22 at the opening usually present for branch line 23. The supply line from delivery system 10 is connected to one leg of pump tee 20 and branch line 23 is connected to the remaining branch. The other required connection is electrical in nature, and extends from the controls operating circulating pump motor 36 to cycle control unit 30, so that delivery system 10 may be activated responsive to the activation of pump motor 36, which occurs after replacement of filter media within filter chamber 25.

In some instances, it is contemplated that a certain amount of filter material liquid may be maintained in vent line 29, upper outlet 14, lower inlet 16, or supply line 17 while delivery system 10 is in a standby attitude. In such cases, if ever more accurate measurement of the delivery of filter material is required, several trial cycles of delivery system 10, delivered into a measuring vessel, will determine a more exact amount of liquid supplied with each cycle. It is expected, however, that the embodiments herein discussed will deliver additional filter material to filter chamber 25 with an accuracy more than sufficient for most filtration applications.

Even though the foregoing embodiments have presented examples specifically drawn to the use of delivery system 10 with automatic filtration apparatus, it is to be understood that the invention herein described may readily be modified to supply required amounts of material to ongoing processes at intervals and in amounts easily and readily controllable as system requirements demand. Where, for example, the system to be supplied has no pump to which convenient connection may be made, a separate pump may be supplied, or delivery system 10 may be positioned to feed any additional material by gravity. Where it becomes important to inject additional material in a more or less steady stream, the controls of the present device may be modified to keep the empty valve open for a given length of time to meet said requirement.

While the foregoing has presented and discussed several specific embodiments of the invention described herein, it is to be understood that these embodiments are being presented by way of example only. It is expected that others, skilled in the art, will perceive variations which, although differing from the foregoing do not depart from the spirit and scope of the invention as herein described and claimed.

What is claimed is:

1. Apparatus for delivering additional filter material from a holding tank to an automatic filtration device, said device of the type having a filter chamber, a circulating pump to deliver process liquid to said filter chamber, and a continuous filter media indexable to position a fresh segment of said filter media within said filter chamber, said apparatus comprising:
   a canister of known, selected volume;
   means to control the intermittent filling of said canister with said additional filter material from said holding tank, and the draining thereof,
   said control means including an ingress to said canister,
   an egress from said canister,
   a solenoid-actuated fill valve positioned along, and controlling, said ingress,
   a solenoid-actuated empty valve positioned along, and controlling, said egress,
   said fill valve and said empty valve operating in tandem,
   said fill valve opening and said empty valve closing to fill said canister,
   said fill valve closing to suspend flow of said additional filter material from said holding tank to said canister, and said empty valve opening to drain said canister,
   said control means further including means to fill and drain said canister a selectable number of times by opening and closing said fill valve and said empty valve responsive to the intermittent operation of said automatic filter; and
   means to deliver said additional filter material from said canister to said automatic filter,
   said fill valve, said canister, said empty valve, and said delivery means defining a single flow path from said holding tank to said filtration device.

2. The apparatus as recited in claim 1 wherein said control means further includes means to manually actuate said control means to initiate the filling and draining of said canister.

3. The apparatus as recited in claim 1 wherein said delivery means further includes non-mechanical means to agitate said additional filter material within said canister prior to the draining thereof.

4. The apparatus as recited in claim 3 wherein said agitation means further includes a stream of compressed air directed to the interior of said canister.

5. The apparatus as recited in claim 4 wherein said compressed air stream is directed to said egress intermediate said canister and said empty valve.

6. The apparatus as recited in claim 1 wherein said delivery means further includes means to purge said canister while said canister is draining.

7. The apparatus as recited in claim 6 wherein said purge means includes a stream of compressed air directed to the top of said canister.

8. The apparatus as recited in claim 1 wherein said canister is formed with an inclined interior bottom surface,
   said bottom surface being generally conical in vertical cross-section.

9. The apparatus as recited in claim 1 wherein said apparatus further includes a vent line extending from said canister and open to the atmosphere;
   a vent valve,
   said vent line opened by said vent valve when said canister is filling.

10. The apparatus as recited in claim 1 wherein said control means is actuated upon the indexing of a fresh segment of filter media into filtering position in said automatic filtration device.

11. The apparatus as recited in claim 1 wherein said control means is actuated upon the shut-down and restarting of said circulating pump.

12. Apparatus for delivering additional filter material from a holding tank to an automatic filtration device, said device of the type having a filter chamber, a circulating pump to deliver process liquid to said filter chamber, and a continuous filter media indexable to position a fresh segment of said filter media within said filter chamber, said apparatus comprising:
   means to control the intermittent delivery of said additional filter material from said holding tank to said device,
   said control means including a solenoid-actuated valve;
   means to direct said additional filter material from said holding tank to said automatic filtration device,
   said directing means including a drain extending from said valve to said holding tank,
   a conduit extending from said automatic filtration device to said valve,
   said drain, said valve, and said conduit defining a single flow path from said holding tank to said automatic filtration apparatus; and
   means to open and close said valve a selectable number of times responsive to the intermittent operation of said automatic filtration device.

13. The apparatus as recited in claim 12 wherein said opening and closing means operates responsive to the shut-down and subsequent restarting of said circulating pump.

14. Apparatus for delivering additional filter material from a holding tank to an automatic filtration device, said device of the type having a filter chamber and a circulating pump to deliver process liquid to said filter chamber, said apparatus comprising:
   a canister of known, selected volume;
   means to control the intermittent filling of said canister with said additional filter material from said holding tank, and the draining thereof,
   said control means including an ingress to said canister, selectively controlled by an ingress valve,
   an egress from said canister, selectively controlled by an egress valve,
   a drain conduit,
   said drain conduit extending from said egress valve to said automatic filtration device,
   said ingress, said ingress valve, said canister, said egress, said egress valve and said drain conduit defining a direct flow path from said holding tank to said automatic filtration device;

means to agitate said additional filter material in said canister prior to the draining of said canister; and means to purge said canister and said egress when said canister is draining.

15. The apparatus as recited in claim 14 wherein said apparatus further includes a vent extending from said canister to a point above the level of additional filter material in said supply tank;

said vent being selectively closeable by a vent valve, when said canister is emptying.

16. The apparatus as recited in claim 14 wherein said agitation means includes a stream of compressed air directed along a first air line to said canister;

said purge means includes a stream of compressed air directed along a second air line to said canister, said first air line selectably closed off by a first valve, said second air line selectably closed off by a second valve.

17. The apparatus as recited in claim 16 wherein said control means further includes means to open said first valve to effect agitation within said canister while said second valve is closed, and means to thereafter close said first valve and open said second valve when said canister is being emptied.

18. The apparatus as recited in claim 16 wherein said first air line is positioned to direct said air stream intermediate said canister and said egress valve.

19. The apparatus as recited in claim 16 wherein said second air line is directed to the top of said canister.

20. A method for adding additional filter material to an automatic filtration apparatus of the type having a filter chamber and a circulating pump directing process liquid to said filter chamber, said method comprising the steps of:

(a) filling a canister of known volume with said additional filter material mixed to a known concentration;

(b) maintaining said additional filter material in said canister;

(c) agitating said filter material in said canister immediately prior to emptying said canister;

(d) emptying said canister;

(e) directing the contents of said canister to said automatic filtration apparatus;

(f) refilling said canister; and (g) repeating steps (a) through (f) a selected number of times to deliver a selected amount of said additional filter material to said automatic filtration apparatus.

* * * * *

UNITED STATES PATENT AND TRADEMARK OFFICE
CERTIFICATE OF CORRECTION

PATENT NO. : 4,329,235
DATED : May 11, 1982
INVENTOR(S) : John G. Koltse

It is certified that error appears in the above-identified patent and that said Letters Patent are hereby corrected as shown below:

Col. 6, line 36: "for" should be --from--.

Signed and Sealed this

Twenty-seventh Day of July 1982

[SEAL]

Attest:

Attesting Officer

GERALD J. MOSSINGHOFF
Commissioner of Patents and Trademarks